United States Patent [19]

Sammel et al.

[11] Patent Number: 5,407,747

[45] Date of Patent: Apr. 18, 1995

[54] FILIFORM CORROSION RESISTANT ALUMINUM AUTOMOTIVE ROAD WHEEL

[75] Inventors: R. K. Sammel, Sinking Spring; Paul H. Radcliffe, Robesonia, both of Pa.

[73] Assignee: Morton International, Inc., Chicago, Ill.

[21] Appl. No.: 11,027

[22] Filed: Jan. 29, 1993

Related U.S. Application Data

[62] Division of Ser. No. 821,414, Jan. 15, 1992.

[51] Int. Cl.⁶ .............................................. B32B 15/08
[52] U.S. Cl. .............................. 428/418; 428/425.8; 428/458; 428/461
[58] Field of Search ...................... 427/195, 386, 388.2, 427/410, 486; 428/425.8, 458, 461, 418; 301/65; 525/117, 119, 124, 131, 934; 148/264, 275

[56] References Cited

U.S. PATENT DOCUMENTS

| | | | |
|---|---|---|---|
| 3,801,379 | 4/1974 | Blackwell | 148/6.27 |
| 3,931,117 | 1/1976 | Leonard . | |
| 4,140,728 | 2/1979 | Hahn et al. | 260/835 |
| 4,278,589 | 7/1981 | Dexter et al. | 260/45.8 |
| 4,281,076 | 7/1981 | Kamimura | 525/934 |
| 4,346,144 | 8/1982 | Craven | 525/124 |
| 4,393,002 | 7/1983 | Weiss et al. | 540/525 |
| 4,402,983 | 9/1983 | Craven | 428/335 |
| 4,421,789 | 12/1983 | Kaneko et al. | 427/204 |
| 4,451,304 | 5/1984 | Batiuk | 148/275 |
| 4,480,008 | 10/1984 | Farronato et al. | 428/425.8 |
| 4,749,430 | 6/1988 | Samuelson et al. | 156/244.11 |
| 4,779,564 | 10/1988 | Kiefer et al. | 118/624 |
| 4,830,101 | 5/1989 | Ohara et al. | 165/133 |
| 4,973,646 | 11/1990 | Witzeman et al. | 428/45 |
| 4,988,767 | 1/1991 | Pettit, Jr. | 525/194 |
| 5,013,791 | 5/1991 | Kerr et al. | 525/113 |
| 5,097,006 | 3/1992 | Kapilow et al. | 525/449 |
| 5,116,892 | 5/1992 | Barbee et al. | 427/195 |
| 5,153,252 | 10/1992 | Skora | 524/372 |
| 5,212,245 | 5/1993 | Franks et al. | 525/223 |

FOREIGN PATENT DOCUMENTS

| | | | |
|---|---|---|---|
| 481183 | 2/1952 | Canada | 148/275 |
| 737705 | 9/1955 | United Kingdom | 148/275 |
| 1024926 | 4/1966 | United Kingdom | 148/275 |

OTHER PUBLICATIONS

Western Wheel Corp. advertisement, Tire Review (May 1986) p. 7w.

*Primary Examiner*—Terry J. Owens
*Attorney, Agent, or Firm*—Robert M. Didrick; Gerald K. White

[57] ABSTRACT

A filiform corrosion resistant aluminum automotive road wheel has a bare aluminum surface, optionally having a chromate conversion coating, which is covered with a thermoset clear coating. The thermoset clear coating is the thermally cured product of a powder coating composition consisting essentially of (1) a major amount of a thermosetting resin selected from the group consisting of polyurethanes, hydroxy functional polyesters, and glycidyl functional acrylic resins, (2) a curing agent, (3) from about 1% to about 5% by weight of the coating powder of an epoxy resin as an adhesion promoting additive, and (4) either an ultra-violet light absorber or a hindered amine light stabilizer or a mixture of both.

3 Claims, No Drawings

FILIFORM CORROSION RESISTANT ALUMINUM AUTOMOTIVE ROAD WHEEL

This is a divisional of application Ser. No. 07/821,414 filed on Jan. 15, 1992.

FIELD OF THE INVENTION

This invention relates to the problem of the spreading of threadlike corrosion at the interface of the metal and a protective coating on bright, non-anodized aluminum automobile wheels and wheel covers before degradation of the coating is observed. More particularly, it relates to a solution of the problem using a clear powder coating as the sole covering for the metal.

BACKGROUND OF THE INVENTION

According to an article by W. H. Slabaugh, W. Dejager, S. E. Hoover, and L. L. Hutchinson in the Journal of Paint Technology, 44, 566, (1972), filiform corrosion occurs on aluminum when it is coated with an organic coating and the system is exposed to relatively high humidities. As the thickness of the coating increases, the rate of growth of the filiform corrosion decreases and the rate of transfer of water vapor from the atmosphere to the metal-coating interface decreases as the thickness of the coating increases. These two premises led to the experimental observation that moisture transfer across the organic film is necessary to support filiform corrosion. In addition to the already established use of anodizing the aluminum to increase the thickness of the oxide layer as a way to control filiform growth, the authors found that filiform corrosion is not likely to start if there are no discontinuities in the organic coating and the normal oxide layer is present. They also found that the presence of chloride ions or other such materials which react with the oxide layer is necessary for filiform corrosion to occur. Since the reduction of the relative humidity to values below 30 to 40% is not practical, the design of a less permeable coating was said to be a possible lead to less filiform corrosion.

The exposed portions of metal wheels on a speeding car are subjected to a fury of grit which abrades the protective coating. A hard and tough film is needed. The film should be non-porous initially and permanently and should retain superior adhesion to the metal to prevent the spread of corrosion at the interface of the film and metal. Visible pitting of the coating, reaching down to the metal surface, is not necessary for the growth of filiform corrosion, however.

Ultra-violet light absorbers and light stabilizers have long been used in coating formulations to retard light-induced yellowing, cracking, checking, and loss of gloss. In U.S. Pat. No. 4,226,763, Dexter et al. teaches some of the history of o-hydroxyphenyl-2H-benzotriazoles as In absorbers and states that its 2-[2'-hydroxy-3',5'-di-($\alpha,\alpha$-dimethylbenzyl) phenyl]-2H-benzotriazole exhibits outstanding efficacy in protecting organic coatings from degradation. In like manner, Rody et al. and Cortolano et al. teach about hindered amines and particularly polymeric polyalkylpiperidines as light stabilizers in U.S. Pat. Nos. 4,299,926 and 5,004,770, respectively. The use of a combination of such UV absorbers and light stabilizers in clear powder coating compositions is taught in U.S. Pat. No. 4,402,983. Said compositions are said to be useful as the clear coat over a color coat in an automobile finish.

Thus, the use of UV absorbers and light stabilizers to prevent the cracking and checking of an organic coating is well known. As was said before, however, the appearance of filiform corrosion precedes any evidence of degradation of the organic coating.

The precise mechanism by which the present invention prevents filiform corrosion at the interface of an aluminum wheel surface and its protective coating is not fully understood. Protective clear coatings have been used in comparable film thicknesses on aluminum wheels before this invention. Such coatings have been observed to fail to prevent filiform corrosion over time even though the coating itself had not suffered visually unacceptable degradation.

SUMMARY OF THE INVENTION

It is an object of this invention, however, to provide a method for protecting the metal substrate under a clear powder coating from filiform corrosion.

It is a related object to provide a method for preventing such corrosion on a metal substrate on which the clear powder coating is the only tegumentary coating on the metal.

These and other objects which will become apparent from the following description of the invention are achieved by applying to the bare metal substrate from about 1.8 to about 3.0 mils of a powder coating containing either a UV absorber or a UV light stabilizer or both and a minor amount of an epoxy resin and curing it. A bare metal, for the purposes of this invention, is one whose surface is devoid of any tegumentary or skin-like covering. An aluminum wheel surface which has been pretreated to form a chromate conversion coating in accordance with well known techniques is included within the meaning of the term bare aluminum surface as it is used herein.

DESCRIPTION OF THE INVENTION

The term aluminum is used herein to mean aluminum and alloys thereof which are suitable for use as automobile wheels or wheel covers. Included in that term, therefore, are suitable aluminum silicon alloys, aluminum lithium alloys, aluminum magnesium, aluminum zinc, aluminum manganese, aluminum copper base alloys such as aluminum bronze, and the like. The alloys may be single, binary, or have more than two metals. Preferably, aluminum wheels in this invention are formed of standard aluminum alloy 356A or the like, other than aluminum.

The method of this invention is not limited to the prevention of filiform corrosion of aluminum substrates, however. Steel substrates, including chrome-plated steels, may also be protected from such corrosion by this method.

In general, any solid epoxy resin having a free epoxy group may be used as the adhesion promoting epoxy resin additive. Resins having an aromatic backbone such as is derived from the bisphenol A or bisphenol F molecule and having an epoxide equivalent weight of from about 100 to about 1500 are preferred. Dow Chemical's XU 71944.00L resin is a preferred adhesion promoter but the EPON 2002 resin and the GT-7013 resin are also exemplary of the epoxy resins useful in the method of this invention. Resins generated from the glycidyl ethers of glycerol and from the reaction of an epoxylated novolac resin with a di- or polyhydric phenol are also suitable. Although, as will be shown below, triglycidyl isocyanurate (TGIC) may be used as the sole cross-linking agent for a carboxylic acid containing polyester base resin in this invention, the TGIC may be used as an additive to make use of its epoxy function for the adhesion improving purposes of this invention. Although epoxy resins, in general, are known to be excellent materials when used alone as coating powders, they are used in this invention in minor amounts along with other resins to increase the adhesion of the powder coating to the metal substrate. That property would, of course, be imparted to a mixture even if the epoxy were used in larger amounts but other desirable properties, such as the weatherability obtained with other resins as recited below, would suffer. The amount of the adhesion promoting additive is preferably from about 3% to about 5% but may range from about 1% to about 20% by weight of the coating powder.

The major or base resin components of the powder coating composition used in this invention, preferably at at least about 70% by weight, are selected from among thermosetting resins such as polyurethanes, polyesters, and acrylics, including acrylate and methacrylate polymers and co-polymers. It will be readily apparent that the resin and its cross-linking agent should be such as to afford a finely divided particulate solid at the storage and application temperatures used in powder coating procedures. The curing of an acidic polyester with a polyepoxide such as triglycidyl isocyanurate yields a useful material commonly known as TGIC polyester. The acidic polyester is available under the trademarks GRILESTA, V7372, CRYLCOAT 430 & 3010, and URALAC 3400 & 3900. Carboxyl functional acidic polyester resins are used preferably in the range of from about 80 to 100 parts by weight, more preferably about 93 parts by weight, together with from about 1 to about 20 parts by weight but preferably about 7 parts by weight of the triglycidyl isocyanurate cross-linking agent.

Hydroxy functional polyesters, in general, form polyester-urethane coatings when cured with caprolactam-blocked isophorone diisocyanate. The hydroxy-functional polyesters are available under the trademarks RUCOTE 107, CARGILL 3000 & 3016, and CRYL-COAT 3109. They are used preferably in the range of from about 50 to about 100 parts by weight and more preferably at about 80 parts by weight. The blocked isocyanate is used together with the hydroxy functional polyester preferably in the range of from about 1 to about 50 parts by weight but more preferably at about 20 parts by weight.

Another suitable powder coating resin, which has superior gloss properties, is a glycidyl methacrylate copolymer cross-linked with a solid dicarboxylic acid. Glycidyl functional acrylic resins useful in this invention are available under the trademarks ALMATEX P-7610, PD 7690, PD 6100, and FINEDIC 229-30. Preferably, glycidyl functional acrylic resins are used in the range of about 50 to about 100 parts by weight, together with the dicarboxylic cross-linking agent in the range of from about 1 to about 50 parts by weight. More preferably, the acrylic resin is used at about 83 parts by weight along with about 17 parts by weight of the cross-linking agent when such is dodecanedioic acid. U.S. Pat. No. 3,781,380, which is incorporated herein by reference, teaches the use of a carboxy-terminated polymer as the cross-linking agent.

Acrylic resins such as those taught in U.S. Pat. No. 3,998,768, which is also incorporated herein by reference, are also suitable for the method of this invention.

When the acrylic resin contains carboxylic acid groups, the amount of the epoxy resin additive will be such as to provide less than 0.7 epoxide group per acid group in the acrylic resin.

The base resins each have special properties, such as a high $T_g$, good storage stability, high gloss, and weatherability, for which they are selected to fill special needs. The integrity and adherence of the fused powder coating that is required to prevent the undercutting by corrosive agents which is known as filiform corrosion, however, is surprisingly imparted to the coating to a great degree by UV absorbers such as 2-hydroxy benzophenone, oxanilide, diphenyl cyanoacrylate and, preferably, o-hydroxyphenyl- 2H-benzotriazole absorbers, exemplified by the TINUVIN 900 product sold by Ciba-Geigy, and by hindered amine light stabilizers which are exemplified by those sold commercially under the trademarks TINUVIN 622LD, Tinuvin 292, Tinuvin 144, Tinuvin 944, UVINOL M-40, and SANDOVER 3056. Either of these two additives may be used alone or in combination with one another but the combination is preferred because of the better corrosion prevention it affords. U.S. Pat. Nos. 4,226,763; 4,229,926; 4,402,983; and 5,004,770 are incorporated herein by reference for their descriptions of the TINUVIN UV absorbers and light stabilizers. The UV absorber is used in a minor amount in the powder coating composition, preferably in the range of from about 0.1 to about 10 parts by weight, more preferably about 2 parts by weight. Such hindered amine light stabilizers are used preferably in an amount of from about 0.1 to about 5 parts by weight but more preferably at about 1 part by weight.

The superiority of coatings containing the above recited additive amounts of an epoxy resin in further combination with the UV absorbing and light stabilizing additives will be seen from the test results shown below.

Antioxidants such as the IRGANOX 1010 hindered phenol and the IRGAFOS 168 phosphite may be incorporated in the powder to minimize discoloration of the coating. These additives are used in amounts ranging from about 0.01 to about 2.0 percent by weight of the powder, preferably about 0.1 part. From about 0.1 to about 5 parts by weight, more preferably about 2 parts by weight, of a flow control agent may be incorporated in the powder coating composition. These are exemplified by the TROY EX-486 flow control agent and one sold under the trademark RESIFLOW P-67. Another flow control agent useful to reduce pinholing in the cured powder coating is benzoin, which is available under the trademark URAFLOW B. It is preferred to use from about 0.1 to about 2 parts, more preferably about 0.25 part, by weight of benzoin.

In the following examples, all parts are by weight unless otherwise stated. The properties of the coatings made from the resins of these examples are given in Table I. Procedures for the tests are well known but abbreviated descriptions of selected ones are as follows:

Hot Plate Melt Flow

A 12.7 mm d×6 mm thick powder pellet (weight accurate within ±0.01 g) is placed on a hot plate set at 375° F. (190° C.±2°) at an inclination angle of 35°. The pellet melts and runs down the plate. The distance from the uppermost point of the original pellet to the extreme lower point is measured with a steel rule to the nearest 0.5 mm.

Gel Time—ASTM D-3451.14

Impact—ASTM D-2794
Pencil Hardness—ASTM D-3363
Gloss—ASTM D-523
MEK Resistance—A cotton swab soaked with methyl ethyl ketone is used to give 50 double rubs to a coated panel. On a scale of 1 to 5, 1 is the worst rating and is given when complete rub-off occurs; 5 means no effect observed.
Blocking Resistance—A one inch (2.54 cm) layer of the powder is placed in a test tube and a 100 gram weight is set on top of the powder. The tube, powder and weight are then placed in an air circulation oven at 110° F. (43° C.) for 24 hrs., whereupon the condition of the powder is rated on a scale of 1 to 10. A rating of 1 means no change and 10 means there was complete blocking.

COMPARATIVE EXAMPLE A

Twenty-four hundred parts of a hydroxy-functional terephthalate of a mixture of neopentyl glycol and trimethylolpropane having an OH value of 50, 600 parts of blocked isophorone diisocyanate, 60 parts of a resinous flow control agent, 60 parts of TINUVIN 900 UV absorber, and 30 parts of TINUVIN 622 light stabilizer were blended together and the blend was then compounded by passing it twice through a single screw BUSS extruder which allowed a maximum temperature of 180° F. The extrudate was then cooled rapidly and broken up into chips and these were mixed with 0.1% by weight of AEROSIL R-972 before being passed through a BRINKMAN grinder having a 12 pin rotor and a 1.0 mm screen to obtain a powder which passes through a 200 mesh sieve. The powder had a gel time at 400° F. of 89 seconds and an HPMF (hot plate melt flow) at 375° F./0.25 gram of 72.

EXAMPLE 1

A blend was made of 2320 parts of the hydroxy-functional terephthalate of Comparative Example A; 580 parts of the isophorone diisocyanate; 58 parts of the flow control agent; 58 parts of the TINUVIN 900; 29 parts of the TINUVIN 622; and 116 parts of a solid bisphenol A epoxy resin sold by Dow Chemical U.S.A. under the designation XU 71944.00L as having an epoxy equivalent weight of 877 and a kinematic viscosity of 3836 centistokes. Only one pass through the extruder was needed for compounding but the maximum temperature was 180° F. again. The chipping and the grinding were generally the same as in Comparative Example A. The −200 mesh powder had a gel time at 400° F. of 79 seconds and its HPMF(375° F./0.25 gram) was 77 mm.

EXAMPLE 2

A poly(glycidyl methacrylate) resin having an epoxy equivalent of 510–560*, a melt index of 50–58**, and sold by Mitsui Toatsu Chemicals, Inc. under the trademark ALMATEX PD-7610 (2407 parts) was blended with 493 parts of dodecanedioic acid, 116 parts of the Dow epoxy resin XU71944.00L of Example 1, 58 parts of the flow control agent, 58 parts of the TINUVIN 900 absorber, and 29 parts of the TINUVIN 622 stabilizer. The blend was then compounded by passing it through the BUSS extruder at a maximum temperature of 260° F. The chipping and grinding steps were generally the same as in Comparative Example A to obtain a powder passing a 200 mesh sieve. The powder had a gel time at 400° F. of 27 seconds and the HPMF(375° F./0.25 gram) was 112 mm.
* HCl-pyrimidine method
** 125° C., 2160 g (ASTM D-238-57T)

COMPARATIVE EXAMPLE B

The general procedure of Comparative Example A was followed except that 2790 parts of a carboxylated polyester resin having an acid value of 32–35*, a T of about 60° C., and sold under the trademark GRILESTA V 73-72 by Ems-Chemie AG of Zurich, and 210 parts of triglycidyl isocyanurate were substituted for the terephthalate and IPDI. The −200 mesh powder had a gel time at 400° F. of 119 seconds and the HPMF(375° F./0.25 gram) was 58.5.
* DIN 53402 method Steel panels were coated with the powders of Comparative Examples A and B, and Examples 1 and 2 in a RANSBERG electrostatic spray system at 60 KV to a thickness within the range of from about 1.8 to about 2.2 mils and the powders were cured at the peak metal temperature and time shown in Table 1, where the properties of the coatings from each example are also given.

TABLE 1

| Example No. | A | 1 | 2 | B |
|---|---|---|---|---|
| CURE | 400° F./15' | 400° F./15' | 350° F./15' | 400° F./15' |
| BLOCKING (1-10) RATING | 4 | 4 | 6 | 5 |
| 60 DEGREE GLOSS (%) | 120 | 123 | 120 | 121 |
| 20 DEGREE GLOSS (%) | 105 | 07 | 103. | 109 |
| DIRECT IMPACT (IN-LBS) | 160 | 160 | 40 | 160 |
| REVERSE IMPACT (IN-LBS) | 160 | 160 | <10 | 160 |
| PENCIL HARDNESS MAR | hb | hb | f | hb |
| PENCIL HARDNESS GOUGE | 2h | 2h | 2h | 2h |
| MEK RUB (1-5 RATING) | 4 | 4 | 4 | 4 |
| ⅛" MANDREL BEND | PASS | PASS | PASS | PASS |
| CLARITY (1-10 RATING) | 9.25 | 8 | 9.5 | 7 |
| YELLOWING (dB) | 8.29 | 7.15 | 1.73 | 4.77 |
| SMOOTHNESS* | vsop | sop | vsop | sop |

*sop = slight orange peel
vsop = very slight orange peel

After 2016 hours in a QUV WEATHER-O-METER, the 60° gloss of steel panels coated with the powders of Comparative Example A and of Examples 1 and 2 and cured as shown above was 85, 69, and 88, respectively. The panel coated with the powder of Comparative Example B gave a 60° reading of 15 after 168 hours in the same WEATHER-O-METER. After 1650 hours in a xenon arc WEATHER-O-METER, panels coated with the powders of Comparative Examples A and B and of Examples 1 and 2 and cured as shown above had 60° gloss readings of 105, 77, 71, and 94, respectively.

The superiority of powder coating formulation of Example 1 as compared to that of Comparative Example A, which does not contain an epoxy resin as an adhesion promoter, is shown by the results of a filiform corrosion test conducted according to the Ford Motor Company's Laboratory Test Method BI 124-1 of sections of a standard aluminum wheel formed from alloy 356A. The sections were given a chromate pretreatment (see below) with ICP 1155 at 87° F. and then coated in a RANSBERG electrostatic spray system at 60 KV with the powders of Comparative Examples A and B and of Examples 1 and 2 and with a commercial powder coating product as a control. The peak metal temperature during cure of the coatings was the same as for the test panels described above. Each wheel section had a minimum coating thickness of 2 mils and all were exposed to accelerated weathering in the Model XW WEATHER-O-METER or its equivalent for 400 hours. An "X" was then scribed through the coating of each of the weathered sections with a carbide tipped scriber and an atmosphere of water vapor and hydrochloric acid vapor was established in a Controlled Atmosphere Chamber available from Ford Motor Company. The sections were held in the closed chamber at room temperature for one hour and placed without rinsing in an Environmental Cabinet available from Thermotron Industries. The temperature in the cabinet was controlled to be 38°±2° C. and the relative humidity was controlled at 80±3%. The sections were inspected every 24 hours and the growth of filiform corrosion from the edge of the scribe was measured and recorded, along with the total number of hours that each section was in the Cabinet. No loss of adhesion was observed on any test section having the coating of this method on its surface. The growth of the filiform corrosion after certain periods of time is given in millimeters in Table 2. The precision of measurement was ±0.2 mm.

The chromate pretreatment procedure is as follows:

Chromate Pretreatment

The bare, untreated surface of the wheel is cleaned with a mild alkaline detergent solution, such as the A-126 solution available from Industrial Chemical Products, City of Industry, Calif., at room temperature (preferably) for about 40 to 60 seconds. The surface then is subjected to a deoxidation step by exposure to a mild sulfuric acid solution for about 2 minutes, preferably at room temperature. A chromate conversion coating is then formed on the deoxidized surface by exposure to a chromate salt solution for a minimum of about 90 seconds, preferably from about 90 to about 120 seconds at a controlled temperature which is preferably at least 84° F. and more preferably about 87° F. Chromate salt solutions suitable for conversion coating of aluminum are available commercially. Industrial Chemical Products offers its 1155-P solution. The aluminum wheel or section thereof is then dried in a convection oven, for example, at a maximum temperature of 140° F. The aluminum surface is still a bare aluminum surface as that term is used herein.

TABLE 2

| | FILIFORM CORROSION GROWTH | | | | |
|---|---|---|---|---|---|
| | Example No. | | | | |
| Time | A | 1 | 2 | B | Control* |
| 300 hrs. | — | — | — | — | 1.6 |
| 408 hrs. | 0.0 | 0.0 | 0.0 | 0.0 | — |
| 816 hrs. | 0.4 | 0.0 | 0.4 | 0.4 | — |
| 1008 hrs. | 0.8 | 0.0 | 1.2 | 0.8 | — |

*GLIDDEN 6C102, a commercial product for use on aluminum wheels

Although the powder coating of Example 2 shows the largest growth of filiform corrosion of the four tested and shown here, it is one of the preferred coatings in the method of this invention because it is far superior in that respect to a powder containing no UV absorber, light stabilizer, or epoxy resin, such as the Control, and also because of its superior resistance to discoloration as shown in Table 1.

The subject matter claimed is:

1. A filiform corrosion resistant aluminum automotive road wheel having a chromate conversion coated bare aluminum surface and a thermoset clear coating on said bare aluminum surface, the clear coating comprising the thermally cured product of a powder coating composition consisting essentially of a glycidyl functional methacrylate copolymer resin, a curing agent consisting of a solid dicarboxylic acid, from about 1% to about 5%, by weight of the coating powder, of an epoxy resin as an adhesion promoting additive, a benzotriazole UV absorber, a hindered amine light stabilizer, a flow control additive and an antioxidant additive.

2. A filiform corrosion resistant aluminum automotive road wheel having a bare aluminum surface and a thermoset clear coating on said bare aluminum surface, the clear coating comprising the thermally cured product of a powder coating composition consisting essentially of a glycidyl functional methacrylate copolymer resin; a curing agent consisting of a solid dicarboxylic acid; from about 1% to about 5%, by weight of the coating powder, of an epoxy resin as an adhesion promoting additive wherein the ratio of equivalents thereof to the number of equivalents of the methacrylate copolymer resin is from about 0.008:1 to about 0.04:1; a benzotriazole UV absorber; a hindered amine light stabilizer; a flow control additive and an antioxidant additive.

3. A filiform corrosion resistant aluminum automotive road wheel having a thermoset clear coating on a bare aluminum surface, the clear coating comprising the thermally cured product of a powder coating composition consisting essentially of a major amount of a thermosetting resin selected from the group consisting of polyurethanes, hydroxy functional polyesters, and glycidyl functional acrylic resins, a curing agent, from about 1% to about 5% by weight of the coating powder, of an epoxy resin as an adhesion promoting additive, and either an ultra-violet light absorber or a hindered amine light stabilizer or a mixture of both; with the proviso that when the powder contains acrylic resin, the curing agent consists of a solid dicarboxylic acid, and when the powder contains a hydroxy functional polyester, the curing agent consists of a blocked isocyanate.

* * * * *